July 7, 1959  G. A. LYON  2,893,785
WHEEL COVER
Filed Sept. 26, 1955
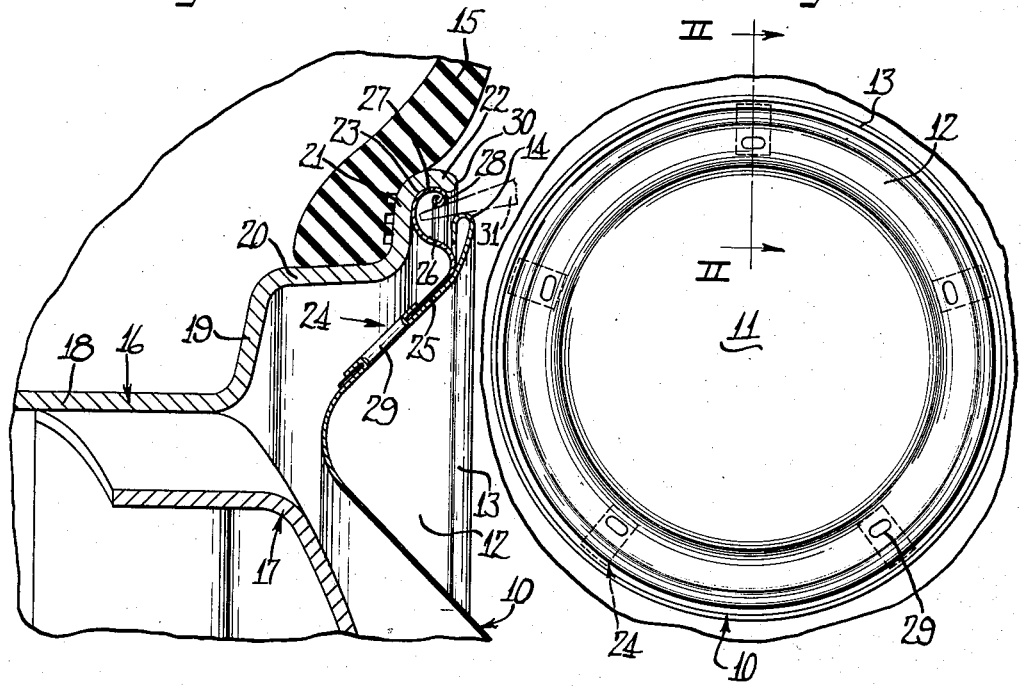
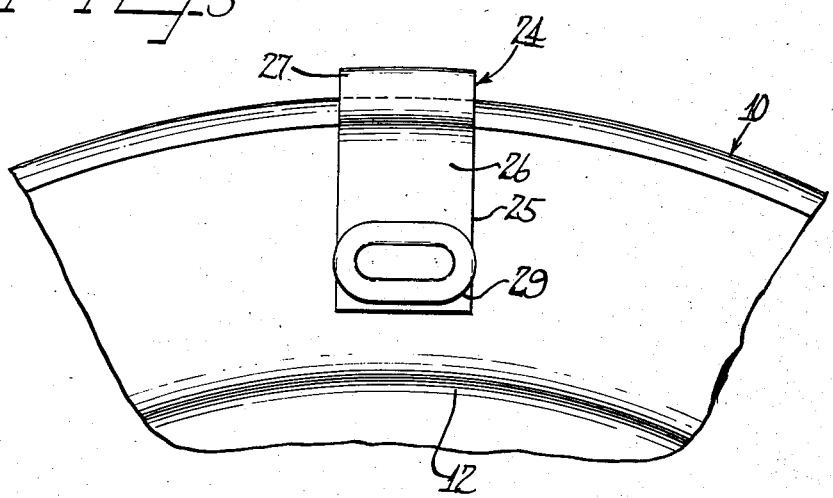
Inventor
George Albert Lyon

United States Patent Office 2,893,785
Patented July 7, 1959

2,893,785

WHEEL COVER

George Albert Lyon, Detroit, Mich.

Application September 26, 1955, Serial No. 536,711

9 Claims. (Cl. 301—37)

This invention relates generally to a novel wheel structure and more particularly to novel retaining means for maintaining the cover on the wheel.

In the automobile industry there is a constant search for new types of retaining means which are capable of maintaining a wheel cover on the wheel. As is known, different ornamental designs in the wheel cover require variable type retaining means to properly maintain the cover on the wheel. In the instant application there is found an ornamental cover having a massive central crown separated from the outer margin of the cover by an annular depression with the cover being of such dimension as to substantially overlie the entire wheel rim and body to conceal same.

Accordingly, it is an object of this invention to provide an ornamental wheel cover with a new and improved type of retaining means for maintaining the cover upon the wheel in a highly efficient manner.

Another object of this invention is to provide a wheel cover construction which lends itself to large scale production on an economical basis.

According to the general features of this invention in a wheel structure including a rim having a generally radially extending annular flange connected to a generally axially outwardly extending annular terminal flange with the junction of the flanges providing an annular seat, a circular cover member for disposition on the outer side of the wheel including a generally radially outwardly extending cover portion, and a plurality of circumferentially spaced retaining spring clips attached to the cover portion each including a generally radially extending attachment and clip back up portion with an outwardly depending portion terminating in an angular return bent terminal capable of snap-on, pry-off engagement in the annular rim seat.

Another feature of this invention relates to the clip being attached to the cover by means of an elliptical hollow rivet capable of resisting relative turning of the clip and cover.

A further feature of this invention relates to the provision of an S-shaped retaining clip capable of snap-on engagement with a tire rim and being of such a construction as to lend itself to cushioning axial impacts upon the cover.

Other objects and features of this invention will more fully appear from the following detailed description taken in connection with the accompanying drawing which illustrates a single embodiment thereof and in which:

Figure 1 is a fragmentary side view of a wheel equipped with my novel cover;

Figure 2 is an enlarged fragmentary cross sectional view taken on substantially line II—II of Figure 1 looking in the direction indicated by the arrows; and Figure 3 is an enlarged fragmentary rear elevation of my novel spring clips capable of retaining the cover on the wheel.

As shown on the drawings:

My novel wheel cover 10 has a relatively large central crown area 11 (Figure 1) which merges at its outer periphery in a depressed annular groove 12 which is in turn connected or joined with the outer margin 13 of the cover. It will be noted that the outer margin is curled or beaded at 14 in order to reinforce the outer margin and to be capable of providing a pry-off edge.

The cover 10 is cooperable with a conventional type of automobile wheel which includes the usual tire 15 of either the tube or tubeless type carried in the customary manner upon a multi-flanged drop center type of tire rim 16. This rim 16 is in turn supported in the usual way on a central dished metallic part 17 having a central bolt-on flange (not shown) by means of which the wheel can be attached by bolts or cap screws (not shown) to a part on an axle of a wheel.

The tire rim 16 includes an attachment flange 18 which is secured to the body part 15, a generally radially outwardly extending flange 19, a generally axially outwardly extending flange 20, a generally radially outwardly extending flange 21, and terminating in an axially extending terminal flange 22. It will be appreciated that the junction of flanges 21 and 22 define together an annular seat 23 which is especially adapted to receive therein retaining means or clips 24 in cover retained engagement.

Clips 24 are adapted to be circumferentially spaced about the outer margin or periphery of the cover 10 carried on the under side thereof. Each of said clips 24 includes a generally radially extending attachment back up portion or flange 25 joined with an inwardly depending portion or flange 26 and terminating in an angular return bent terminal 27 having a curled rigidifying bead 28. Each of the clips 24 are attached to the under side of the cover by an elliptical hollow rivet 29 which serves to insure co-rotation of the clip and cover, or more specifically, prevents relative turning of the clip and cover.

The instant spring clip 24 is of the type that is capable of being stressed generally radially inwardly so that clip portion 27 may engage another surface under tension. Best results have been found to be obtainable by utilizing a generally S-shaped clip having an attachment flange 25 which tends to rigidly back up the flexible or resilient portion 27. Still further, the particular angular inclination of the portion 26 relative to the other component portions permits a certain resiliency in the maintenance of the cover upon the wheel. That is, when an axial force or impact is struck upon the cover 10, depending portion 26 tends to flex slightly axially inwardly and thereby resiliently absorb at least some of the shock.

By virtue of employing spring clips, it will be appreciated that the cover 10 may be made from any suitable material. Excellent results have been found to be obtainable by utilizing materials which lend themselves to high degrees of polishing thereby enhancing the overall ornamental appearance of the cover member.

Assembly of the cover member may be affected by initially centering the cover 10 with respect to the outer rim terminal 22 and thereafter engaging clip portion 27 against rim shoulder 30 and thereafter urging the cover axially inwardly with the result that portion 27 is stressed radially inwardly over shoulder 30 and is thereafter bottomed in resilient tensioned engagement in seat 23.

Removal of the cover member 10 may be effected by inserting a suitable pry-off tool 31 between the cover bead 14 and clip bead 30 into the cavity defined therebetween and thereafter levering the tool until the tip thereof engages against cover bead 14 whereupon through the exertion of an adequate force the cover 10 may be ejected from the wheel and more specifically retaining clips 24 from seat 23.

It will be understood that modifications and variations may be effected without departing from the scope of the novel concepts of the present invention.

I claim as my invention:

1. In a wheel structure including a rim having a generally radially extending annular flange connected to a generally axially outwardly extending annular terminal flange with the junction of the flanges providing an annular seat, a circular cover member for disposition on the outer side of the wheel including a generally radially outwardly extending cover portion having an outer marginal edge disposed radially inwardly of the terminal rim flange, and a plurality of circumferentially spaced retaining spring clips attached to said cover portion each including a generally radially extending attachment and clip back up portion with an outwardly depending portion terminating in an angular return bent generally axially outwardly extending terminal capable of snap-on, pry-off engagement in the annular rim seat, said return bent terminal being disposed between said terminal rim flange and said outer marginal edge spaced radially outwardly of said outer marginal edge.

2. In a wheel structure including a rim having a generally radially extending annular flange connected to a generally axially outwardly extending annular terminal flange with the junction of the flanges providing an annular seat, a circular cover member for disposition on the outer side of the wheel including a generally radially outwardly extending cover portion having an outer marginal edge disposed radially inwardly of the terminal rim flange, and a plurality of circumferentially spaced retaining spring clips attached to said cover portion each including a generally radially extending attachment and clip back up portion with an outwardly depending portion terminating in an angular return bent generally axially outwardly extending terminal capable of snap-on, pry-off engagement in the annular rim seat, said return bent terminal being disposed between said terminal rim flange and said outer marginal edge spaced radially outwardly of said outer marginal edge, said outer marginal edge being beaded and defining with said clip a cavity capable of receiving a pry-off tool therein.

3. In a wheel structure including a rim having a generally radially extending annular flange connected to a generally axially outwardly extending annular terminal flange with the junction of the flanges providing an annular seat, a circular cover member for disposition on the outer side of the wheel including a generally radially outwardly extending cover portion having an outer marginal edge disposed radially inwardly of the terminal rim flange, and a plurality of circumferentially spaced retaining spring clips attached to said cover portion each including a generally radially extending attachment and clip back up portion with an outwardly depending portion terminating in an angular return bent generally axially outwardly extending terminal capable of snap-on, pry-off engagement in the annular rim seat, said return bent terminal being disposed between said terminal rim flange and said outer marginal edge spaced radially outwardly of said outer marginal edge, said clip attachment flange being attached to said cover portion by an elliptical hollow rivet capable of resisting relative turning of said clip and cover.

4. In a wheel structure including a rim having a generally radially extending annular flange connected to a generally axially outwardly extending annular terminal flange with the junction of the flanges providing an annular seat, a circular cover member for disposition on the outer side of the wheel including a generally radially outwardly extending cover portion having an outer marginal edge disposed radially inwardly of the terminal rim flange, and a plurality of circumferentially spaced retaining spring clips attached to said cover portion each including a generally radially extending attachment and clip back up portion with an outwardly depending portion terminating in an angular return bent generally axially outwardly extending terminal capable of snap-on, pry-off engagement in the annular rim seat, said return bent terminal being disposed between said terminal rim flange and said outer marginal edge spaced radially outwardly of said outer marginal edge, said depending clip portion being angularly disposed relative to said radial rim flange thereby being capable of cushioning impact forces by flexing axially inwardly in response thereto.

5. A cover for disposition on the outer side of a multi-flange drop center type tire rim, said cover having circumferentially spaced generally S-shaped spring clips attached to the under side of the cover adjacent its outer margin capable of snap-on, pry-off retaining engagement in an annular rim seat provided at the outer margin of the tire rim, each clip having a free axially outwardly extending resilient terminal end disposed radially outwardly beyond the outer periphery of the cover so that a pry-off tool may be fulcrumed against the cover periphery underneath said terminal to facilitate disengagement of the cover from the tire rim.

6. A cover for disposition on the outer side of a multi-flange drop center type tire rim, said cover having circumferentially spaced generally S-shaped spring clips attached to the under side of the cover adjacent its outer margin capable of snap-on, pry-off retaining engagement in an annular rim seat provided at the outer margin of the tire rim, each clip having a free axially outwardly extending resilient terminal end disposed radially outwardly beyond the outer periphery of the cover, so that a pry-off tool may be fulcrumed against the cover periphery underneath said terminal to facilitate disengagement of the cover from the tire rim, and means connecting each clip to the cover capable of insuring against turning of the clip relative to the cover.

7. In a wheel structure including a rim having a generally axially outwardly extending annular rim flange, a circular cover member for disposition on the outer side of the wheel including an outer marginal edge disposed radially inwardly of said rim flange, and a plurality of circumferentially spaced resiliently deflectable cover retaining clips on said cover for cover retaining engagement with said rim flange each including an attachment portion, and a clip portion connected to said attachment portion defining a generally axially outwardly opening pocket, said clip portion including a retaining portion for detachable biting tensioned engagement with said rim flange and terminating in an axially outwardly extending turned terminal portion spaced radially outwardly from said outer marginal edge enabling one end of a pry-off tool to be inserted into said pocket behind said turned terminal portion and fulcrumed against said marginal edge and upon urging another and opposite end of the tool radially inwardly toward the central axis of wheel structure releasing the tension between the clip and the tire rim to facilitate removal of the cover from the wheel.

8. The wheel structure of claim 7 further characterized by said turned terminal portion being beaded for reinforcement and said marginal edge being turned under to provide a reinforced fulcrum edge.

9. The wheel structure of claim 7 further characterized by said clip portion having a C-shaped configuration with one end of the C connected to the attachment portion and another end of the C comprising said retaining portion.

References Cited in the file of this patent

UNITED STATES PATENTS

| | | |
|---|---|---|
| 2,433,854 | Lyon | Jan. 6, 1948 |
| 2,654,637 | Lyon | Oct. 6, 1953 |
| 2,683,630 | Lyon | July 13, 1954 |